L. H. GILMER.
BELT AND BAND.
APPLICATION FILED SEPT. 9, 1918.
1,326,656.
Patented Dec. 30, 1919.
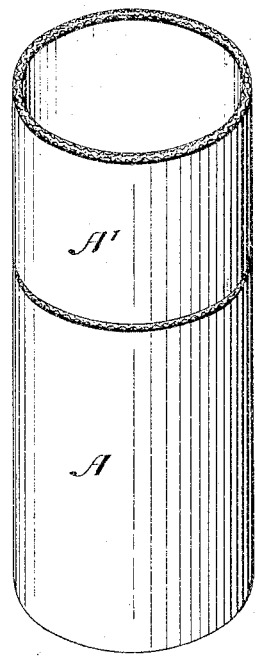
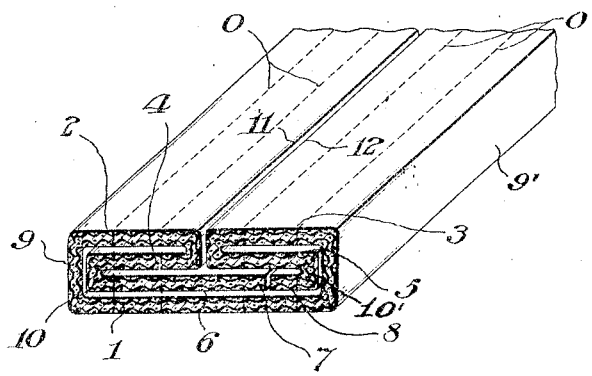
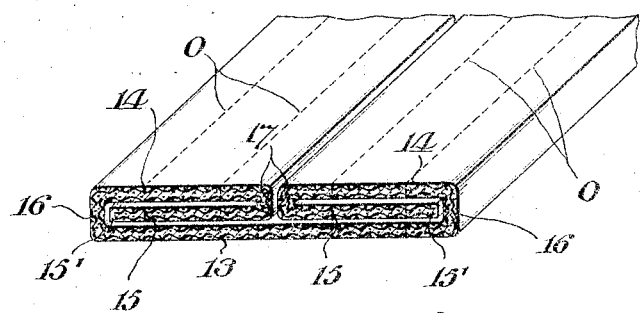
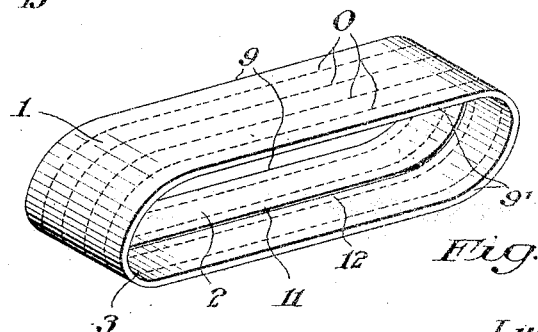
Inventor:
Ludwell H. Gilmer,
By C. N. Butler
Attorney

UNITED STATES PATENT OFFICE.

LUDWELL H. GILMER, OF PHILADELPHIA, PENNSYLVANIA.

BELT AND BAND.

1,326,656.  Specification of Letters Patent.  Patented Dec. 30, 1919.

Application filed September 9, 1918. Serial No. 253,178.

*To all whom it may concern:*

Be it known that I, LUDWELL H. GILMER, a citizen of the United States, residing in the city of Philadelphia, county of Philadelphia, and State of Pennsylvania, have invented certain Improvements in Belts and Bands, of which the following is a specification.

My invention is an endless laminated belt or band, adapted to be made from sections cut transversely from woven tubular fabric, and my chief purpose is to provide an efficient, durable, and convenient construction of improved character at comparatively small cost.

The invention is characterized by the provision of an endless laminated belt or band having substantially uniform thickness and strength throughout its cross section, with the raw edges concealed as well as protected by binding them within the structure and with only a single exposed joint extending longitudinally between the edges of the device.

In the accompanying drawings, Figure 1 represents a perspective view of a woven tube cut in sections; Fig. 2 illustrates in cross section a portion of a belt or band embodying the invention; Fig. 3 is a perspective view of the finished device; and Fig. 4 illustrates in cross-section a portion of a belt or band embodying my invention in modified form.

As shown in the drawings, the woven tube A is cut transversely to its length in sections A' which have their edges turned in and laminated, as illustrated in Fig. 2, the laminations being sewed together to produce the structure shown in Fig. 3, or a structure of the same exterior form may be produced by means of the arrangement illustrated in Fig. 4.

As illustrated in Fig. 2, the structure comprises the laminations 1, 2, 3, 4, 5, and 6, the raw edges 7 and 8 or ends of the tube section lying in one of the concealed laminations as 6 and being concealed. The lamination 1 is connected at its edges with the outer edges of the respective laminations 2 and 3 by the unbroken outer parts 9 and 9' forming jointless edges for the structure. The laminations 2 and 3 are connected at their inner edges with corresponding edges of the respective concealed laminations 4 and 5 by the unbroken adjacent parts 11 and 12 without joint. The laminations 4 and 5 are connected to the concealed lamination 6 by the unbroken parts 10 and 10' lying within the respective edges 9 and 9' and the lamination 6 is formed by sections joined along the abutting or juxtaposed edges 7 and 8 which are covered by the laminations 1 and 5.

These laminations are fastened together, as by rows of through stitching *o*, with the production of an endless belt or band having the desired characteristics with no exposed edges and with the material arranged symmetrically.

As illustrated in Fig. 4, the belt or band may be composed of laminations 13, 14 and 15. The lamination 13 is connected at its outer edges with the outer edges of the laminations 14 by the unbroken parts 16 forming jointless edges for the structure, and the laminations 14 are connected with the laminations 15 by the unbroken parts 17, the inner laminations 15 having their raw edges 15', disposed within and adjacent to the respective edges 16 and the several laminations being connected by the stitching *o* parallel to the length of the structure.

In this simpler construction, there are found the same characteristics of symmetry of construction and concealed and protected raw edges.

It will be seen that there is thus provided an endless band or belt having the material arranged symmetrically on each side of a central longitudinal plane, providing uniformity throughout all cross sections in the arrangement of the material and the capacity for resistance to tensile forces, and with reduction to a minimum of all tendencies to unequal elongation.

Having described my invention, I claim:—

1. An endless band having jointless edges and comprising integrally connected outer and inner laminations, the edges of the material from which said band is made being covered.

2. An endless band having jointless edges and comprising integrally connected outer and inner laminations, said inner laminations being connected with outer laminations aforesaid along adjacent edges thereof within the edges of said band.

3. An endless belt having jointless edges and formed of integrally connected laminations with a single exposed joint disposed between the jointless edges thereof, the edges of the material from which said band is made being covered.

4. An endless band of woven material having integral connected lamitations, said band having jointless edges and concealed laminations with covered raw edges.

5. An endless, laminated, woven band having jointless edges and a continuous longitudinal joint between said edges, said band having concealed laminations connected by jointless edges lying within the edges aforesaid.

6. An endless, laminated, woven band having jointless edges and a continuous longitudinal joint between said edges, said band having concealed laminations connected by jointless edges lying within the edges aforesaid and one of said concealed laminations comprising sections having juxtaposed edges covered by other of said laminations.

In testimony whereof I have hereunto set my name this 4th day of Sept., 1918.

LUDWELL H. GILMER.